(12) United States Patent
Macliver

(10) Patent No.: US 10,500,998 B2
(45) Date of Patent: Dec. 10, 2019

(54) SEAT

(71) Applicant: Kevin Scott Macliver, Birmingham (GB)

(72) Inventor: Kevin Scott Macliver, Birmingham (GB)

( * ) Notice: Subject to any disclaimer, the term of this patent is extended or adjusted under 35 U.S.C. 154(b) by 0 days.

(21) Appl. No.: 15/645,435

(22) Filed: Jul. 10, 2017

(65) Prior Publication Data

US 2018/0009347 A1    Jan. 11, 2018

(30) Foreign Application Priority Data

Jul. 11, 2016    (GB) ..................... 612031.3

(51) Int. Cl.
| | | |
|---|---|---|
| *B60N 2/80* | (2018.01) | |
| *B60N 2/885* | (2018.01) | |
| *B60N 2/28* | (2006.01) | |
| *B60N 2/882* | (2018.01) | |
| *B60N 2/806* | (2018.01) | |

(52) U.S. Cl.
CPC .......... *B60N 2/885* (2018.02); *B60N 2/2851* (2013.01); *B60N 2/2872* (2013.01); *B60N 2/806* (2018.02); *B60N 2/882* (2018.02); *B60N 2002/899* (2018.02)

(58) Field of Classification Search
CPC ........ B60N 2/885; B60N 2/882; B60N 2/806; B60N 2/4805; B60N 2/4879; B60N 2/4882; B60N 2002/899; B60N 2002/4888
USPC ........................................................ 297/397
See application file for complete search history.

(56) References Cited

U.S. PATENT DOCUMENTS

| | | | |
|---|---|---|---|
| 3,655,241 A | 4/1972 | Herzer et al. | |
| 9,475,411 B2 * | 10/2016 | Gagnade | B60N 2/2851 |
| 2006/0226689 A1 | 10/2006 | Linnenbrink et al. | |
| 2012/0306243 A1 * | 12/2012 | Oltman | B60N 2/2884 |
| | | | 297/216.11 |

(Continued)

FOREIGN PATENT DOCUMENTS

| | | |
|---|---|---|
| DE | 10349929 | 7/2001 |
| DE | 102013001336 | 7/2014 |

(Continued)

OTHER PUBLICATIONS

Search Report for corresponding GB application No. GB1612031.3 dated Dec. 14, 2016.

(Continued)

*Primary Examiner* — Mark R Wendell
(74) *Attorney, Agent, or Firm* — Caesar Rivise, PC

(57) ABSTRACT

A seat (S) comprises a seat portion (SP) having an occupant supporting surface (SPU) and a back portion (BP) having an occupant supporting surface (BPU) and head rest assembly (1), the head rest assembly (1) having a head rest portion (2) and a side impact portion (3), the head rest assembly (1) being secured or securable to the seat (S), and being movable towards and away from a seat portion (SP) of the seat (S), the side impact portion (3) comprising a pair of peripheral elongate portions (3a) which are pivotable together about a common pivot axis (P) and relative to the head rest portion (2) between a first position wherein each peripheral elongate portion (3a) extends along the occupant supporting surface (BPU) of the back portion (BP) of the seat (S) toward the seat portion (SP) and a second or stowed position.

17 Claims, 4 Drawing Sheets

(56) References Cited

U.S. PATENT DOCUMENTS

2013/0049429 A1  2/2013  Yetukuri et al.
2015/0266403 A1  9/2015  Wagner et al.
2016/0046217 A1  2/2016  Wagner et al.

FOREIGN PATENT DOCUMENTS

| DE | 102014205457 | | 9/2015 |
|----|--------------|---|--------|
| EP | 0747259 | | 12/1996 |
| EP | 1190893 | | 3/2002 |
| EP | 2626238 | | 8/2013 |
| FR | 3000709 | | 7/2014 |
| GB | 1161330 | | 8/1969 |
| GB | 3B2302268 | | 1/1997 |
| GB | 2415616 | | 1/2006 |
| JP | S6070349 | | 5/1985 |
| JP | S61105057 | | 7/1986 |
| JP | 2004161213 | | 6/2004 |
| KR | 20160004112 | | 11/2016 |
| TW | M506059 | | 8/2015 |
| WO | WO 98/24651 | | 6/1998 |
| WO | WO2005/002909 | | 1/2005 |
| WO | WO 2005/002909 | | 1/2005 |
| WO | WO 2013/188371 | | 12/2013 |
| WO | WO2017/020877 | * | 2/2017 |

OTHER PUBLICATIONS

English abstract of FR3000709.
European Search Report for related European Patent Application No. EP17180822 dated Nov. 21, 2017.

* cited by examiner

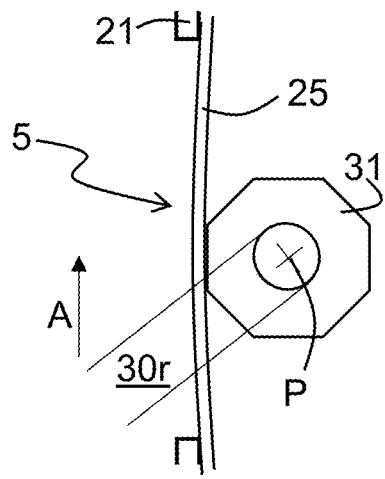
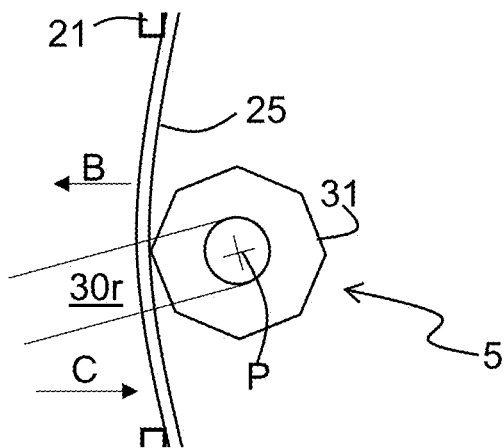
FIGURE 4a  FIGURE 4b
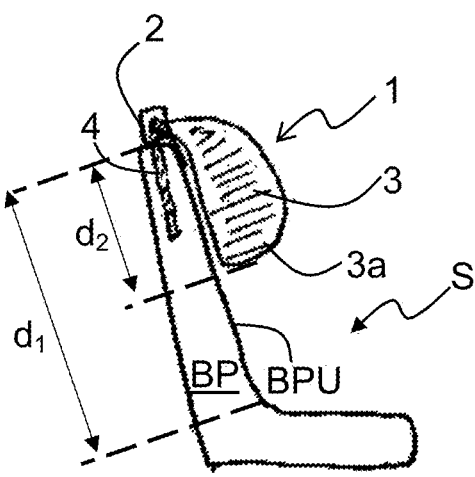
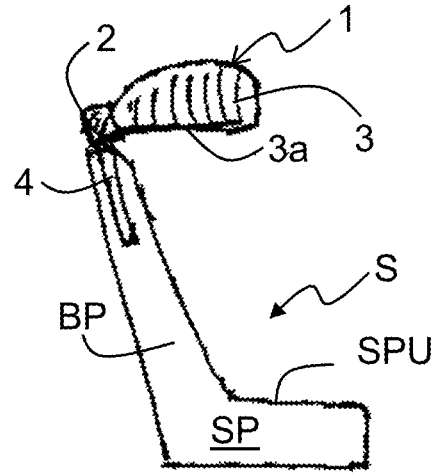
FIGURE 5a  FIGURE 5b
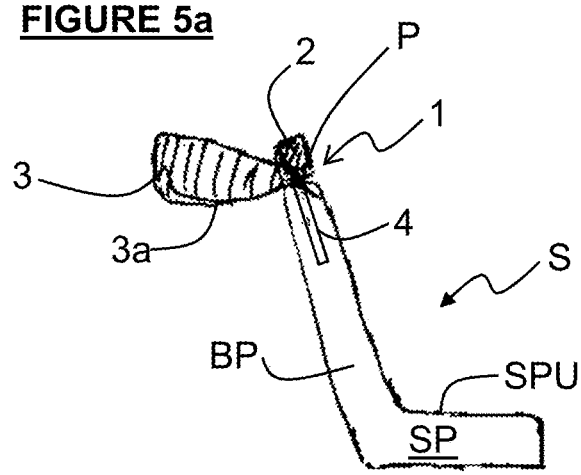
FIGURE 5c

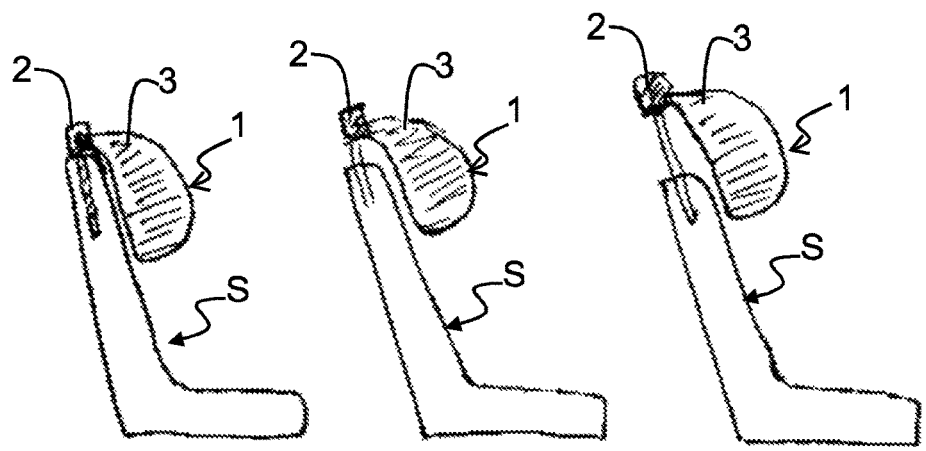
FIGURE 6a  FIGURE 6b  FIGURE 6c
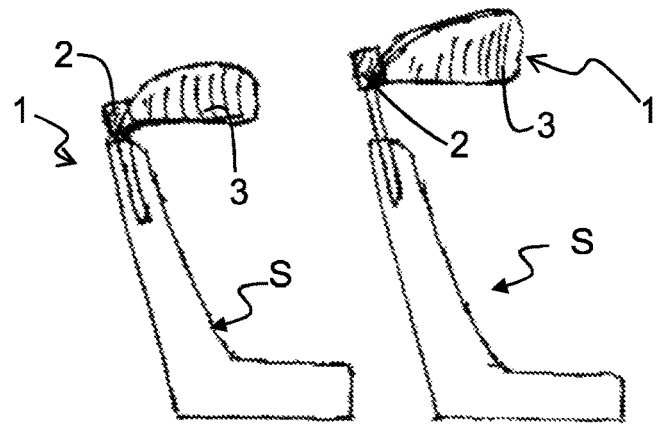
FIGURE 6d  FIGURE 6e
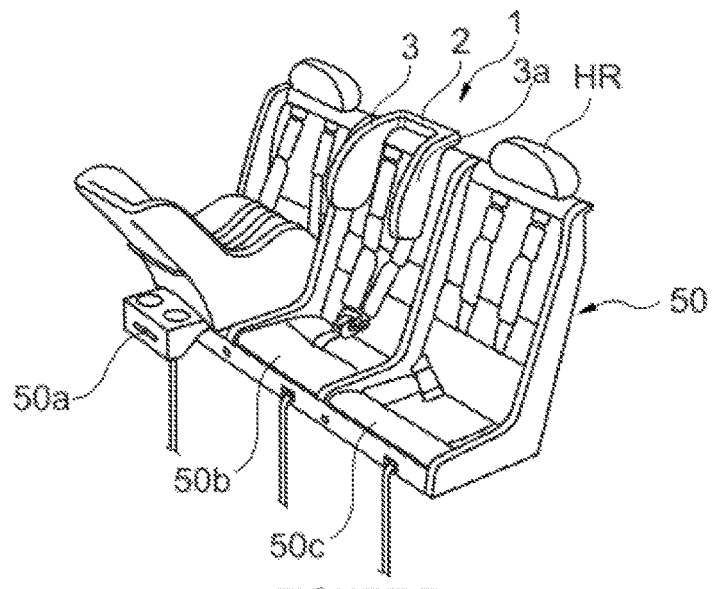
FIGURE 7

SEAT

CROSS-REFERENCE TO RELATED APPLICATIONS

This patent application claims the benefit under 35 U.S.C. § 119(a) of UK Application Serial No. GB1612031.3 filed on Jul. 11, 2016 entitled SEAT and whose entire disclosure is incorporated by reference herein.

BACKGROUND OF THE INVENTION

This invention relates generally to a seat. More specifically the invention relates to a seat comprising a head rest assembly and to a head rest assembly attachable to a seat.

Traditional head rest assemblies for seats for vehicles do not offer protection against a side impact to said vehicle. In more recent years protection has been developed against side impact damage to users of seats in which the head rest assembly comprises side impact protection barriers, vertically oriented on either side of a user's head, in use. The side impact protection barriers may comprise a rigid support frame covered with a resilient, softer material designed to cushion a user's head should contact occur thereagainst. In the event of a side impact the user's head will be restrained from moving beyond the confines of the head rest assembly by the side impact protection barriers.

Provision of side impact protection in seats for children who are under a threshold size and/or age is or is becoming a legislative requirement in some jurisdictions (e.g. European Regulation ECE R129). Moreover, it is foreseen that such legislation may extend to require side impact protection in seats for users having a greater age and/or size in future.

Currently, seats including side impact protection are designed to accommodate a specific range of sizes of users. For example, such seats commonly accommodate children from birth up to 3 years old. If side impact protection is required for a user older than 3 years old (or taller than the threshold height value) then a different seat must be provided or the head rest assembly must be replaced. Such replacement is time consuming, inconvenient and costly, resulting in disincentives to utilize side impact protection if the user is beyond the threshold height and/or age afforded by the head rest assembly or seat in situ.

In our prior patent application WO2005/002909, we disclose a multiple occupancy car seat. The seat is provided with plural seat portions so as to accommodate an individual on each seat portion, thereby to increase occupancy and to allow plural individuals to be conveyed safely. One of the advantages of our car seat is that each seat portion can be configured to accommodate different size and/or age occupants. This means that as a child grows, or as the occupancy requirements change (for example when it is desired to convey two 12 year olds and two 3 year olds and subsequently four 8 year olds), the seat can be configured appropriately. The above-identified problem of side impact protection may be exacerbated in such a car seat.

BRIEF SUMMARY OF THE INVENTION

It is therefore a first non-exclusive object of the invention to provide an improved seat, for example an improved multiple occupancy car seat. It is an alternative or additional non-exclusive object of the invention to provide a seat that overcomes or at least mitigates the issues identified above.

Accordingly, a first aspect of the invention provides a seat having a seat portion and a back portion and comprising a head rest assembly, the head rest assembly having a head rest portion and a pair of peripheral elongate portions, the head rest assembly being movable towards and away from the back portion and the pair of peripheral elongate portions being pivotable about the head rest portion between a first position wherein each peripheral elongate portion extends adjacent or proximate a respective side of the back portion to a second or stowed position.

A second aspect of the invention provides a seat comprising a seat portion having an occupant supporting surface and a back portion having an occupant supporting surface and head rest assembly, the head rest assembly having a head rest portion and a side impact portion, the head rest assembly being secured or securable to the seat, and being movable towards and away from a seat portion of the seat, the side impact portion comprising a pair of peripheral elongate portions which are pivotable together about a common pivot axis and relative to the head rest portion between a first position wherein each peripheral elongate portion extends along the occupant supporting surface of the back portion of the seat toward the seat portion and a second or stowed position.

A further aspect of the invention provides a head rest assembly for a seat having a seat portion and a back portion, the head rest assembly having a head rest portion and a pair of peripheral elongate portions, the head rest assembly being securable to the seat and, in use, being movable towards and away from the back portion and the pair of peripheral elongate portions being pivotable about the head rest portion between a first position wherein each peripheral elongate portion extends adjacent or proximate a respective side of the back portion to a second or stowed position.

Advantageously, the head rest assembly can provide side impact protection to seat occupants of different statures whilst being quickly and easy stowable to allow occupants to cross the seat, for example in a vehicle, and particularly, for example, in a multiple occupancy children's seat for location on the existing seat of a vehicle.

Advantageously the movability of the head rest assembly ensures that different sized occupants can be accommodated in the seat whilst providing an occupant of the seat with side impact protection, through the peripheral elongate portions. Moreover, by having the peripheral elongate portions pivot, the seat is able to accommodate different sized occupants and can be stowed to ensure that they do not provide a hindrance to occupants attempting to move across the seat, for example in a car or other vehicle.

This is of particular advantage in a multiple occupancy car seat, such as that disclosed in WO2005/002909.

In the second or stowed position each peripheral elongate portion may extend at or beyond a position substantially parallel to a plane defined by the back portion.

The back portion of the seat has a pair of opposed side edges and a top or terminal edge which defines therebetween the occupant supporting surface. In embodiments, in the first position, the elongate peripheral portions are inboard of the opposed side edges. In embodiments, in the first position, the elongate peripheral portions extend adjacent, and may abut, the occupant facing surface of the back portion.

The peripheral elongate portions may provide side-impact means or side-impact protection. Said side impact means or protection (for example the peripheral elongate portions) may comprise a foam or cushion material, preferably covered in a further material, and being capable of absorbing energy when suffering an impact. The head rest portion preferably comprises a foam or cushion material, preferably covered in a further material. In an embodiment the occupant supporting surface of the back portion may extend from the seat portion to a terminal edge of the back portion by a distance d1 and, in the first position, the peripheral elongate portions may extend along the occupant supporting surface of the back portion by a distance d2, and wherein d2 is from of 0.1d1 to 0.6d1. In embodiments d2 may be from 0.1d1 or 0.2d1 to 0.5d1, for example from between 0.1d1 or 0.2d1 and 0.4d1.

The head rest assembly may comprise one or more legs which engage with corresponding apertures in the back portion of the seat. The head rest portion may be pivotable with respect to the one or more legs.

The head rest assembly may comprise means or a mechanism to allow the peripheral elongate portions to pivotally move in a step-wise or index fashion as it pivots between first and second positions. In embodiments the peripheral elongate portions may be locatable in plural stable positions as they are rotated between the first and second positions.

In an embodiment the head rest assembly may comprise an over-centre mechanism for bi-directional rotation of the peripheral elongate portions relative to the head rest portion around an axis of rotation between a first stable position and a second stable position. Preferably application of a force tangential to the axis of rotation is sufficient to rotate the head rest assembly away from the first or second stable position.

The over-centre mechanism may be capable of step-wise rotation of the head rest assembly relative to the seat body, e.g. where step-wise rotation comprises rotation between three or more stable positions. One of the stable positions of the head rest assembly relative to the seat body may comprise a position in which the head rest assembly is stowed or parked, e.g. when, in use, relative to the seat body.

The use of an over-centre mechanism providing for rotation by the application of only a force tangential to an axis of rotation allows for easy and rapid rotation of the head rest assembly relative to the seat.

It will be understood by a person of skill in the art that in this specification the term 'stable position' refers to a position of the head rest assembly relative to the seat body requiring the application of a relatively greater force to move out of than to move to or toward, e.g. from a non-stable position. Movement from a first stable position to a second stable position comprises moving through a non-stable position. The force required to move from a stable position to or toward a non-stable position is greater than the force required to move from a non-stable position to or toward a stable position (e.g. the first or second stable position). The term 'over-centre' should be taken to refer to a mechanism having the above-described characteristics.

Rotation of the head rest assembly relative to the seat body may be achieved without prior disengagement of a locking mechanism.

The head rest assembly, for example the over-centre mechanism, may comprise first and second abutment members, e.g. configured to engage one another (for example during pivotable motion, e.g. rotation, of the peripheral elongate portions relative to the head rest portion). One or both of the abutment members may be configured to generate a biasing force, e.g. against the other abutment member. The biasing force may be increased by relative rotation of the abutment members away from a stable position relative to one another. The biasing force may be decreased by relative rotation of the abutment members to or toward a stable position relative to one another. The biasing force may bias one or both abutment members to or toward a stable position relative to one another.

The first abutment member may comprise a non-circular cross-section perpendicular to the axis of rotation. The first abutment member may comprise an active portion configured or configurable to engage, in use, with the second abutment member. The active portion of the first abutment member may comprise an external surface.

One skilled in the art will appreciate that the term 'non-circular' in the context of the non-circular cross-section of the first abutment member requires that the active portion of said first abutment member does not define a circle perpendicular to the axis of rotation. The term 'non-circular' requires that the external surface of the active portion of the first abutment member does not define a constant radius from the axis of rotation. Preferably the first abutment member comprises an external surface describing a regular or irregular polygon. Most preferably, the external surface describes a regular polygon, which polygon may have from 3 to 10 sides, preferably 5 to 8 sides. In a preferred embodiment we prefer an octagonal surface. Alternatively, the external surface may be elliptical or ovoid.

The first and/or second abutment member may be resilient.

The second abutment member may be resiliently biased by a biasing means or biaser. The second abutment member may be resiliently biased, in use, towards the first abutment member, for example by the biasing means or biaser. The biasing means or biaser may comprise a spring. The biasing means or biaser may be configured or configurable to bias the second abutment member in a direction perpendicular or tangential to the axis of rotation.

The first and/or second abutment member may comprise a resilient material. Relative rotation of the first and second abutment members may cause at least partial deformation of one or both abutment member(s).

Relative rotation of the first and second abutment members to or toward a non-stable position may comprise flexing or resilient deformation of the first and/or second abutment member. Relative rotation of the first and second abutment members to or toward a stable position may comprise relative relaxation of the first and/or second abutment member, for example to or toward a non-flexed or deformed shape thereof. The second abutment member may comprise a resilient sheet, e.g. against which the first abutment member is engaged or engagable in use.

The second abutment member may comprise a hollow or concave member. The second abutment member may be co-aligned with the first abutment member. The second abutment member may comprise an active portion, for example configured or configurable to engage the first abutment member, in use. The active portion of the second abutment member may comprise an interior surface. The interior surface may comprise a non-circular or non-round cross-section perpendicular to the axis of rotation.

The head rest assembly may comprise a frame assembly comprising a first frame and a second frame. The first frame may comprise a central portion and a pair of peripheral portions. A peripheral elongate portion may be retained on each of the peripheral portions. The central portion may extend through the head rest portion. The central portion may comprise the first abutment member.

The second frame may support the head rest portion. In an embodiment the second frame comprises an aperture, and preferably a pair of matched apertures. The central portion may be pivotally retained within the aperture or the pair of matched apertures. The second frame may comprise the second abutment member. The first abutment member may be engaged, for example it may be held captive by, the second abutment member.

The second frame may comprise a pair of legs. The legs may be retained or retainable, for example slidably retained or retainable, in apertures located within the back portion of the or a seat. The seat may comprise height adjustment means or apparatus. The legs may comprise at least a portion of height adjustment means or apparatus such that the head rest assembly is secureable at a user-defined height relative to the back portion of the or a seat. The height adjustment means or apparatus may comprise a height retention mechanism, for example comprising plural projections or recesses and a cooperating engaging member configured to restrict (e.g. substantially restrict) motion, e.g. vertical motion, of the head rest assembly relative to the back portion of the seat.

The seat may be a seat for a vehicle, and particularly a seat to be fitted onto an existing vehicle seat. In an embodiment, the seat is a multiple occupancy car seat.

There is further provided, in a further aspect of the invention a seat comprising a head rest assembly pivotably attached or attachable to a seat body, the seat comprising an over-centre mechanism for bi-directional rotation of the head rest assembly relative to the seat body around an axis of rotation between a first stable position and a second stable position, where application of a force tangential to the axis of rotation, alone, is sufficient to rotate the head rest assembly away from the first or second stable position.

A yet further aspect of the invention provides a head rest assembly pivotably attached or attachable to a seat body, the head rest assembly comprising an over-centre mechanism for bi-directional rotation of the head rest assembly relative to the seat body, when attached thereto, around an axis of rotation between a first stable position and a second stable position, where application of a force tangential to the axis of rotation, alone, is sufficient to rotate the head rest assembly away from the first or second stable position.

A yet further aspect of the invention provides a method of retro-fitting a seat comprising a seat portion and a back portion, the method comprising installing a head rest assembly as set out above on the seat. The method may comprise removing an existing head rest.

For the avoidance of doubt, any of the features described herein apply equally to any aspect of the invention.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one aspect or embodiment of the invention are applicable to all aspects or embodiments, unless such features are incompatible.

BRIEF DESCRIPTION OF SEVERAL VIEWS OF THE DRAWINGS

Embodiments of the invention will now be described by way of example only with reference to the accompanying drawings in which:

FIGS. 4a and 4b show partial sectional views of a rotation mechanism comprising component shown in FIGS. 2 and 3;

FIGS. 5a to 5c show sectional side views of a seat including a head rest according to the invention in which the head rest has been adjusted into different positions;

FIGS. 6a to 6e show sectional side views of a seat including a head rest according to the invention in which the head rest has been adjusted into different positions;

FIG. 7 shows a multiple seat arrangement comprising a head rest according to the invention;

DETAILED DESCRIPTION OF THE PREFERRED EMBODIMENTS

Figure 1:
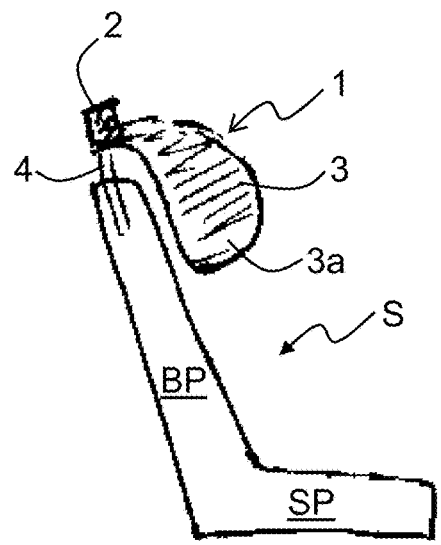
FIG. 1 shows a partial side view of a seat according to an embodiment of the invention.

Referring now to FIG. 1, there is shown a side view of a seat S according to the invention. The seat S comprises a seat portion SP and a back portion BP (each having an occupant-facing or supporting surface) with a head rest assembly 1 mounted thereto. The seat S may be a vehicle seat or a seat to be installed onto an existing vehicle seat. The head rest assembly 1 comprises a head rest portion 2 and a side impact portion 3 comprising a pair of peripheral elongate portions 3a (only one of which shown in FIG. 1). Both the head rest portion 2 and the peripheral elongate portions 3a comprise a foam material (or other energy absorbing material) upholstered with a face material, in the known manner for seats.

The head rest assembly 1 comprises a pair of legs 4 for slidable engagement within apertures located within the back portion BP of the seat S.

Figure 2:
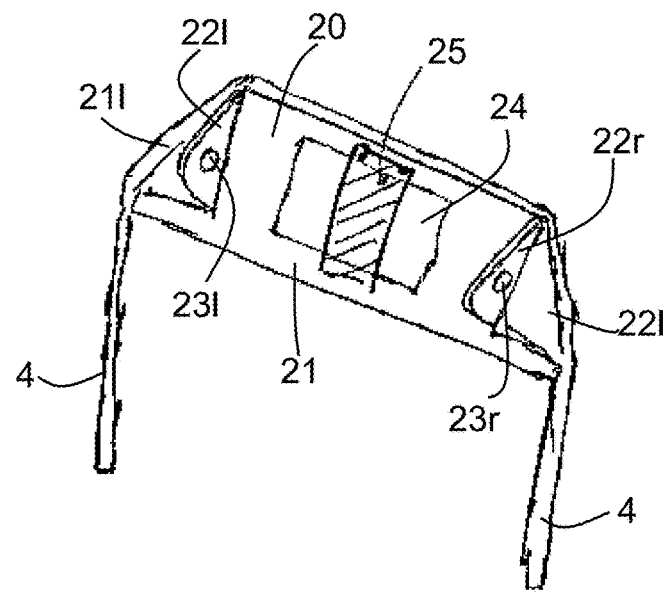
FIG. 2 shows a perspective view of a component part of a head rest shown in FIG. 1.

As shown in FIG. 2, the head rest portion 2 comprises a head rest frame 20 on or about which a head rest foam material (see FIG. 7) is disposed. The head rest frame 20 comprises a central portion 21 having a pair of terminal edges 21l and 21r respectively. Upstanding from the central portion at or towards each respective edge 21l, 21r is a pair of flanges 22l, 22r, each provided with an aperture 23l, 23r. Located between the terminal edges 21l, 21r, and preferably equidistant between the terminal edges 21l, 21r, is an aperture 24 extending through the central portion 21. Mounted across the aperture 24 is a resilient biaser 25, which may be formed of spring steel. The resilient biaser 25 provides an abutment member. The aforementioned legs 4 depend from the frame 20 at or proximate the terminal edges 21l, 21r of the central portion 21. The frame 20 will typically be formed of metal, such as steel, with the components welded to each other, as or where appropriate.

Figure 3:
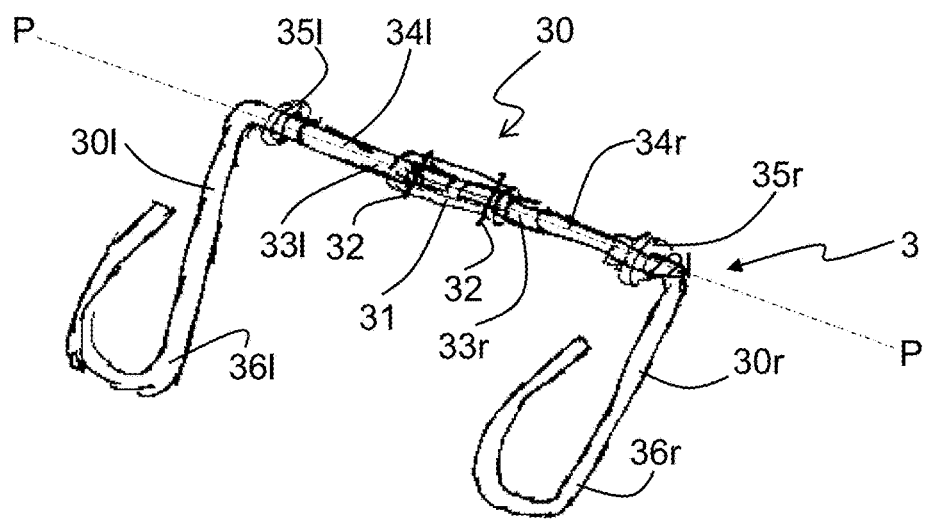
FIG. 3 shows a perspective view of another component part of the head rest shown in FIG. 1.

Turning to FIG. 3, the side impact portion 3 comprises a frame 30 formed in two parts 30l, 30r joined together at their respective ends by a sleeve member 31. The sleeve member 31 is secured to each of the parts 30l, 30r by a key arrangement and/or by a captive pin 32 extending though the sleeve member 31 and an aperture in a respective first end 33l, 33r of each of the parts 30l, 30r of the frame 30.

Each of the frame parts 30l, 30r comprises a respective axle portion 34l, 34r carrying a respective bush 35l, 35r (which may be formed from polyamide or other plastics material). Extending from each respective axle portion 34l, 34r is a hook portion 36l, 36r. In use, the each hook portion 36l, 36r will be covered in a foam or other energy absorbing material and upholstered with a face material (see FIG. 7), in the usual manner for seats. The frame parts 30l, 30r will typically be fabricated from metal, such as steel. The sleeve member 31 (which provides a further abutment member)

will typically be formed from a metal material, for example steel. In a preferred embodiment, the periphery of the sleeve member 31 is non-circular. In a most preferred embodiment the periphery of the sleeve member 31 describes a regular or irregular polygon.

In use, each axle portion 34*l*, 34*r* will extend through a respective aperture 23*l*, 23*r* of the flanges 22*l*, 22*r* such that each bush 35*l*, 35*r* is engaged within the respective aperture 23*l*, 23*r* to provide a pivot axis or point P (see FIG. 4A). The sleeve member 31 is retained or captured behind the resilient biaser 25. In this fashion, the side impact portion 3 is rotatable about an axis defined by the axle portions 34*l*, 24*r* such that is pivots relative to the head rest portion 2.

Referring now to FIGS. 4*a* and 4*b*, there are shown partial sectional views of the sleeve member 31 captured and engaging the resilient biaser 25 and providing an over-centre mechanism 5. In this embodiment the sleeve member 31 provides a first abutment member and the resilient biaser 25 provides a second abutment member.

FIG. 4*a* shows the over-centre mechanism 5 in a stable position. The distance between the pivot axis P to provide an axis of rotation of the first abutment member 31 and the second abutment member 25 is at a minimum in this stable position. The resilient biaser 25 member is at an equilibrium position and whilst there may be some residual tension in the biaser 25 it is restrained from further motion against that tension.

FIG. 4*b* shows the over-centre mechanism 5 in a non-stable position, which has been achieved by rotation of the side impact portion 3 in the direction of arrow A. The distance between the pivot axis P of rotation of the first abutment member 31 and the second abutment member 25 is relatively greater in this non-stable position than in the stable position described above (and shown in FIG. 4*a*). In the non-stable position shown in FIG. 4*b* the resilient biaser 25 is resiliently deformed towards a flexed shape or con-figuration in the direction of arrow B. As a consequence of the resilience of the resilient biaser 25 a biasing force is exerted by the resilient biaser 25 toward and against the first abutment member 31 in the direction of arrow C.

Relative rotation of the side impact portion 3 and head rest portion 2 (and consequential rotation of first abutment member 31 and second abutment member 25 is achieved by the application of a force tangential to the axis of rotation. The force is applied at the side impact portion 3 of the head rest assembly 1 in this embodiment, causing the axle portions 34*r*, 34*l* and hence the first abutment member (sleeve 31) to rotate relative to the second abutment member (resilient biaser 25).

Relative rotation of the first and second abutment members 31, 25 from the stable position shown in FIG. 4*a* toward the non-stable position shown in FIG. 4*b* requires a relatively greater rotational force than does relative rotation of the first and second abutment members 31, 25 from the non-stable position shown in FIG. 4*b* to or toward the stable position shown in FIG. 4*a*. This is because rotation from the stable to or toward the non-stable position results in resilient deformation of the second abutment member 25, where the second abutment member 25 thereby generates a biasing force against the first abutment member 31. Consequently, the first and/or second abutment member(s) 31, 25 preferentially move to or toward a stable position from a non-stable position, due to the resilient biasing force acting against the first and/or second abutment members 31, 25.

In such a fashion, the side impact portion 3 is encouraged to adopt a stable position and thereby a step-wise or indexed rotation of the side impact portion 3 about the head rest portion 2 is achievable.

Referring now to FIGS. 5*a* to 5*c*, there is shown a seat S according to the invention with the head rest assembly 1 in different positions relative to the seat S. FIG. 5*a* shows a seat S with the head rest assembly 1 in a forward orientation in which the head rest portion 2 is able to support a head (should the occupant be large enough) and the peripheral elongate members 3*a* of the side impact portion 3 are each adjacent the occupier-supporting surface BPU of the back portion BP of the seat S. In this position the peripheral elongate portions 3*a* extend along the back portion BP toward the seat portion SP. FIG. 5*b* shows the seat S with the head rest assembly 1 rotated relative to the seat S, for example by 90 degrees, such that the peripheral elongate members 3*a* of the side impact portion 3 are oriented substantially parallel to the occupier-supporting surface SPU of the seat portion SP, for example oriented substantially perpendicularly relative to the occupier-supporting surface BPU of the back portion BP. FIG. 5*c* shows the seat S with the head rest assembly 1 in a fully stowed position or orientation in which the head rest assembly 1 has been rotated relative to the seat S into a position where the peripheral elongate members 3*a* of side impact portion 3 project behind the seat S.

Advantageously, rotating the head rest assembly 1 relative to the seat S such that the head rest assembly is in the fully stowed position allows free and unfettered access to the seat S, for example thereby facilitating easier movement of people and or objects (or storage of said objects). In one example, where it is necessary to access a person or object on the far side of the seat S, access to that person or object is significantly easier and less restricted with the head rest assembly 1 rotated into a stowed position. Although FIG. 5*c* shows a fully stowed position, any position of the head rest assembly 1 between the position shown in FIG. 5C and a position where the peripheral elongate members 3*a* are located upwardly (e.g. substantially vertically or in a direction substantially parallel to a plane defined by the back portion BP of the seat S) will provide a stowed configuration in which ease of access to or across the seat S is enhanced.

The location (e.g. height) of the head rest assembly 1 relative to the seat S may be adjusted by sliding the legs 4 from the apertures of the back portion BP of the seat S. Such an adjustment may be made in a step-wise manner, e.g. such that the height of the head rest assembly 1 relative to the seat S may be adjusted between plural preconfigured positions. The legs 4 may comprise plural notches or projections whilst the engagement apertures in the seat back BP may comprise a locking mechanism configured to releasably engage with a notch or projection adjacent thereto. The locking mechanism may comprise a spring or other biasing member configured to bias the locking mechanism into an engaged position or condition. In use, the locking mechanism may be disengaged (e.g. via actuation of a release element, such as button or latch) and the legs 4 slid toward a new position within the engagement apertures. When the locking mechanism engages a notch or projection, e.g. by being biased theretoward by the biasing member, the locking mechanism may prevent further sliding of the legs 4 relative to the engagement aperture, thereby retaining the head rest assembly 1 at a particular height relative to the seat S. It will be appreciated that the notches or projections and/or the locking mechanism may be configured to prevent, when engaged together, sliding of the engagement rod relative to the engagement aperture in one or both directions.

In the position shown in FIG. 5a, the head rest assembly 1 is at its nearest to the back portion BP of the seat S, for example the legs 4 have been slid within the apertures of the back portion BP of the seat S such that the head rest assembly 1 is at its minimum height. The back portion BP of the seat S extends by a distance $d_1$ from the seat portion SP to a distal edge BP1 of the back portion BP. When the head rest assembly 1 is at its nearest to the back portion BP of the seat S, with the peripheral elongate portions 3a in the first position, the peripheral elongate portions 3a extend from the distal edge BP1 of the back portion BP toward the seat portion SP by a distance $d_2$, which is between about a tenth and a half of the distance $d_1$ by which the back portion BP extends from the seat portion SP. In embodiments, distance $d_2$ may be between about an eighth and a third of the distance $d_1$. In other embodiments d2 is from 0.1d1 to 0.6d1, for example by a distance of 0.1d1 or 0.2d1 to 0.5d1, for example by a distance of between about 0.1d1 or 0.2d1 and 0.4d1.

Referring now to FIGS. 6a to 6e, there are shown a series of different orientations of a head rest assembly 1 relative to the seat S.

In FIG. 6a the head rest assembly 1 is at a minimum height relative to the seat S and the head rest assembly 1 is rotated relative to the seat S such that the peripheral elongate members 3a of the side impact portion 3 are adjacent a occupier-facing side BPU of the back portion BP side of the seat S. In the arrangement of the seat S shown in FIG. 6a the seat may be suitable for use by a relatively shorter user, for example a child up to the age of, say, 3 years old.

In FIG. 6b the height of the head rest assembly 1 relative to the seat S has been relatively increased with respect to the orientation shown in FIG. 6a. In the arrangement of the seat S shown in 6b the seat S may be suitable for use by a slightly taller user than in the arrangement shown in FIG. 6a, for example a child between the ages of 3 and 6 years old.

In FIG. 6c the height of the head rest assembly 1 relative to the seat S has been relatively increased again with respect to the orientation shown in FIG. 6b. In the arrangement of the seat S shown in FIG. 6c the seat S may be suitable for use by yet taller user, for example a child between the ages of 6 and 7.

In FIG. 6d the height of the head rest assembly 1 relative to the seat S is at its minimum value whilst the head rest assembly 1 has been rotated relative to the seat S such that the peripheral elongate members 3a of the side impact portion 3 project substantially perpendicularly relative to the occupier-facing surface BPU of the back portion BP of the seat S. In the arrangement of the seat S shown in FIG. 6d the seat may be suitable for use by an even taller user, for example a child between the ages of 7 and 12.

In FIG. 6e the height of the head rest assembly 1 relative to the seat S has been relatively increased again with respect to the orientation shown in FIG. 6d. In the arrangement of the seat S shown in FIG. 6e the seat S may be suitable for use by an even taller user, for example a child older than 12 years old or an adult.

As will be appreciated, in each case the head rest portion 2 remains in the same orientation relative to the back portion BP whilst the head rest assembly 1 is raised (or lowered) and the side impact portion 3 is rotated about the pivot point P.

Advantageously, rotation of the head rest assembly 1 relative to the seat S allows the seat S to be adjusted into arrangements in which the side impact protection portion 3 is adjacent the head of an occupant regardless of said occupier's height. Therefore, the side impact portion 3 continues to fulfil its function of protecting an occupant's head from an impact from the side thereof. Consequently, using the seat S there is no need to replace the head rest assembly 1 for a different (e.g. relatively longer or shorter) head rest assembly when occupants of different heights use the seat. Beneficially, the seat S thereby has a reduced expense relative to a less adjustable seat whilst also ensuring that the safety of an occupant of said seat S is maintained with respect to side impacts regardless of the height of said occupant.

Referring now to FIG. 7, there is shown a multiple occupancy seat 50 (as described, for example, in WO2005/002909) comprising a seat S according to the invention. In this embodiment there are three seat portions (50a, 50b, 50c) wherein the middle seat portion 50b is a seat S according to the invention comprising a head rest assembly 1. However, it will be understood that any suitable number of seats may be provided and that one, more or all of the seat portions 50a, 50b, . . . 50n may be a seat S according to the invention. In this embodiment the first seat portion 50a is configured for a medium size child, which may be about 10 years of age, the middle seat portion 50b is configured for a child of, say, up to 3 years of age, and the third seat portion 50c is configured for an infant of say under 15 months of age, with a rearward facing child seat.

As can be seen, the side impact portion 3 comprises peripheral elongate members 3a which extend along the back portion BP of the seat S, in the first position, to provide side impact protection for the seat's occupier. The head rest assembly 1 of the seat S, as shown, comprises a relatively small or low profile upholstered head rest portion 2. Alternatively that head rest portion 2 can have any configuration, for example it could be formed in the same shape as the head rest HR of the first seat portion 50a. Indeed, because the side protection portion 3 pivots about the head rest portion 2 there is no limit on the shape or configuration of the head rest portion 2, which may also be able to tilt or pivot relative to the back portion BP of the seat S so as to improve comfort.

Because the head rest assembly 1 can move away from and towards the back portion BP of the seat S the seat can accommodate different sized users. Moreover, because the side impact portion 3 can pivot the seat can be used by different sized users. Also, because the head rest assembly can be pivoted to a stowed condition it can be moved so as to not obstruct access to an adjacent seat, which can be a problem, especially if there are more than two seat portions 50a, 50b in a seat 50.

Figure 8:
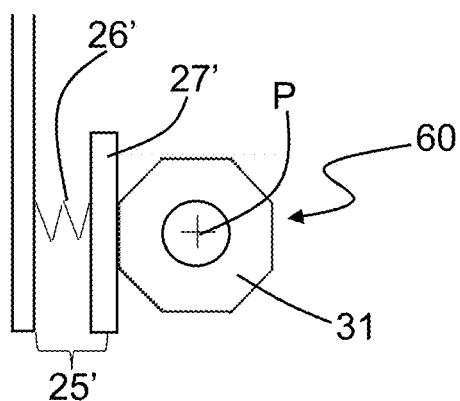
FIG. 8 shows an alternative rotation mechanism according to the invention.

Referring now to FIG. 8, there is shown a partial sectional view of an over-centre mechanism 60 according to an alternative embodiment of the invention. The second abutment member 25' includes a biasing member 26', which in this embodiment is one or more springs. The biasing member 26' is configured to resiliently bias an abutment plate 27' toward the first abutment member 31.

In use, rotation of the first abutment member 31 relative to the second abutment member 25' causes the distance between the axis of rotation and the second abutment member 25' to alter. When the first and second abutment members (31, 25') are in a stable position, as shown in FIG. 8, the distance between the axis of rotation and the second abutment member (25') is at a minimal distance. Rotating the first and second abutment members (31, 25') relative to one another from the stable position shown in FIG. 8 increases the distance between the axis of rotation and the second abutment member (25') thereby increasing the biasing force generated by the biasing member 26' urging the second abutment member 25' toward and against the first abutment member 31. Consequently, the first and second abutment members (31, 25') preferentially move to a stable position from a non-stable position, as described above in respect of the embodiment shown in FIGS. 4a and 4b.

Figure 9:
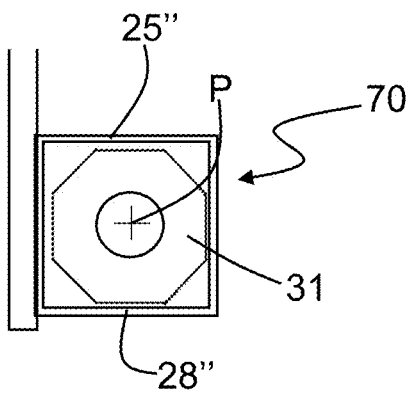
FIG. 9 shows an alternative rotation mechanism according to the invention.

Referring now to FIG. 9, there is shown a partial sectional view of an over-centre mechanism 70 according to an alternative embodiment of the invention. In the over-centre mechanism 70 shown the second abutment member 25" comprises a hollow enclosure 28' co-aligned with the first abutment member 31. The hollow enclosure 28' includes an active portion configured to engage the first abutment member, in use. The active portion of the hollow enclosure 28' includes an interior surface having a non-circular cross-section perpendicular to the pivot axis or axis of rotation P.

One or both of the first and second abutment members 31, 25" is formed from a resilient material. The first abutment member 31 and the non-circular interior cross-section of the second abutment member 25" are dimensioned and sized such that relative rotation of the two members from the stable position shown in FIG. 9 results in resilient deformation of one or both of the first and second abutment members 31, 25". The resilient deformation of one or both of the first and second abutment members 31, 25" during rotation from a stable position to or toward a non-stable position generates a resilient biasing force between the first and second abutment members 31, 25". Consequently, the first and second abutment members 31, 25" preferentially move to or toward a stable position from a non-stable position, as described above in respect of the embodiment shown in FIGS. 4a and 4b.

As shown in FIG. 3, there are two bushes 35l, 35r to provide bearings. However, the skilled person will appreciate that any number and/or type of suitable bearings may be used. Also as shown, the sleeve member 31 is located inboard of the bushes 35l, 35r, e.g. toward the longitudinal centre of the axle. However, the sleeve member 31 may be at any suitable location and there may be plural sleeve members 31.

The sleeve member 31 is preferably hollow and is restrained from rotating relative to the axle portions 34l, 34r by any suitable means. In embodiments the sleeve member 31 may be integral with the axle and/or may not comprise a sleeve.

The axle portions 34l, 34r may have a circular cross-section, though it will be understood that they may have any suitable cross-sectional shape. The free, proximal end of the legs 4 are configured to slidably engage with suitably sized and arranged cooperating engagement apertures (not shown) in the top portion of the seat S.

It will be appreciated by one skilled in the art that the second abutment member may not resiliently deform and that instead the first abutment member may be configured to resiliently deform. Alternatively, both the first and second abutment members may be configured to resiliently deform.

It will be appreciated by those skilled in the art that several variations to the aforementioned embodiments are envisaged without departing from the scope of the invention. For example, although the engagement surface is shown as having an octagonal cross-section this need not be the case and instead the engagement surface may have any suitable non-circular cross-section, for example, square, rhomboid, ovular, hexagonal, etc. In embodiments the engagement surface may comprise a cross-section comprising a circle including one or more projection therefrom.

Additionally or alternatively, although the embodiment shown in FIGS. 2 to 4b includes an opening in a central portion of the transverse support member this need not be the case and instead the opening may be provided in any suitable portion of the transverse support member. Additionally or alternatively, plural openings may be provided. Where plural openings are provided there may be plural biasing sheets, each secured across a suitably sized and dimensioned opening. Additionally or alternatively, there may be plural first abutment members. The plural first abutment members may be aligned with the plural biasing sheets (if provided). Moreover, whilst the above describes the side impact portion 3 moving as a unitary body, it is also possible to have each of the peripheral elongate portions 3a move (i.e. pivot) independently of the other.

It will also be appreciated by those skilled in the art that any number of combinations of the aforementioned features and/or those shown in the appended drawings provide clear advantages over the prior art and are therefore within the scope of the invention described herein.

The invention claimed is:

1. A seat comprising a seat portion having an occupant supporting surface and a back portion having an occupant supporting surface and head rest assembly, the back portion having a terminal edge, the back portion extending from the seat portion to the terminal edge by a distance d1, the head rest assembly having a head rest portion and a side impact portion, the head rest assembly being secured or securable to the seat, and being movable towards and away from a seat portion of the seat, the side impact portion comprising a pair of peripheral elongate portions which are pivotable together about a common pivot axis and relative to the head rest portion between a first position wherein each peripheral elongate portion extends along the occupant supporting surface of the back portion of the seat toward the seat portion by a distance d2, and wherein d2 is from 0.2d1 to 0.6d1, and a second or stowed position and wherein in said second or stowed position each peripheral elongate portion extends in a direction substantially parallel to a plane defined by the back portion and each peripheral elongate portion extends adjacent to and beyond the top of the head rest portion.

2. A seat according to claim 1, wherein the head rest portion and the side impact portion are together movable towards and away from the seat portion of the seat, in use.

3. A seat according to claim 1, wherein the head rest assembly is configured such that, in use, pivoting of the pair of peripheral elongate portions about the common pivot axis is synchronized.

4. A seat according to claim 1, wherein in the second or stowed position, in use, each peripheral elongate portion extends at or beyond a position substantially parallel to a plane defined by the occupant supporting surface of the back portion.

5. A seat according to claim 1, wherein the pivot axis extends through the head rest portion.

6. A seat according to claim 1, wherein the seat is a part of a multiple occupancy car seat for installation upon a seat of a vehicle.

7. A seat comprising a seat portion having an occupant supporting surface and a back portion having an occupant supporting surface and head rest assembly, the head rest assembly having a head rest portion and a side impact portion, the head rest assembly being secured or securable to the seat, and being movable towards and away from a seat portion of the seat, the side impact portion comprising a pair of peripheral elongate portions which are pivotable together about a common pivot axis and relative to the head rest portion between a first position wherein each peripheral elongate portion extends along the occupant supporting surface of the back portion of the seat toward the seat portion and a second or stowed position and wherein in said second or stowed position each peripheral elongate portion extends in a direction substantially parallel to a plane defined by the back portion and each peripheral elongate portion extends beyond the top of the head rest position, wherein the head rest assembly comprises means to allow the peripheral elongate portions to adopt sequential stable positions as the peripheral elongate portions move between the first and second positions.

8. A seat according to claim 7, wherein the head rest assembly comprises an over-centre mechanism for bi-directional rotation of the peripheral elongate portions relative to the head rest portion about the common pivot axis between a first stable position and a second stable position.

9. A seat according to claim 8, wherein the over-centre mechanism is configured for step-wise rotation of the peripheral elongate portions relative to the seat body.

10. A seat according to claim 7, wherein the occupant supporting surface of the back portion extends from the seat portion to a terminal edge of the back portion by a distance d1 and wherein in the first position the peripheral elongate portions extend along the occupant supporting surface of the back portion by a distance d2, and wherein d2 is from 0.1d1 or 0.2d1 to 0.5d1.

11. A seat comprising a seat portion having an occupant supporting surface and a back portion having an occupant supporting surface and head rest assembly, the head rest assembly having a head rest portion and a side impact portion, the head rest assembly being secured or securable to the seat, and being movable towards and away from a seat portion of the seat, the side impact portion comprising a pair of peripheral elongate portions which are pivotable together about a common pivot axis and relative to the head rest portion between a first position wherein each peripheral elongate portion extends along the occupant supporting surface of the back portion of the seat toward the seat portion and a second or stowed position and wherein in said second or stowed position each peripheral elongate portion extends in a direction substantially parallel to a plane defined by the back portion and each peripheral elongate portion extends beyond the top of the head rest position, wherein the pivot axis is provided by a common hinge provided by a first abutment member of the side impact portion and a second abutment member of the head rest portion, wherein, during pivoting of the peripheral elongate members relative to the head rest portion, one or both of the abutment members is configured to at least partially deform.

12. A seat according to claim 11, wherein the occupant supporting surface of the back portion extends from the seat portion to a terminal edge of the back portion by a distance d1 and wherein in the first position the peripheral elongate portions extend along the occupant supporting surface of the back portion by a distance d2, and wherein d2 is from 0.1d1 to 0.6d1.

13. A seat according to claim 11, wherein the first abutment member comprises a non-circular cross-section perpendicular to the axis of rotation.

14. A seat according to claim 11, wherein at least part of the first and/or second abutment member is resilient.

15. A seat according to claim 11, wherein the first and second abutment members are configured to generate a biasing force therebetween which increases as one or both peripheral elongate portions are rotated away from a stable position and toward an unstable position relative to the head rest portion.

16. A head rest assembly for a seat, the head rest assembly having a head rest portion and a side impact portion, the head rest assembly being securable to a seat to be movable towards and away from a seat portion of the seat, the side impact portion comprising a pair of peripheral elongate portions which are pivotable together about a common hinge and relative to the head rest portion between a first position wherein each peripheral elongate portion extends along the occupant supporting surface of the back portion of the seat toward the seat portion and a second or stowed position and wherein in said second or stowed position each peripheral elongate portion extends in a direction substantially parallel to a plane defined by the back portion and each peripheral elongate portion extends beyond the top of the head rest portion, the head rest assembly comprises means to allow the peripheral elongate portions to adopt sequential stable positions as the peripheral elongate portions move between the first and second positions.

17. A head rest assembly for a seat, the head rest assembly having a head rest portion and a side impact portion, the head rest assembly being securable to a seat to be movable towards and away from a seat portion of the seat, the side impact portion comprising a pair of peripheral elongate portions which are pivotable together about a common hinge and relative to the head rest portion from a first position to a second position and are able to adopt plural stable positions between the first and second positions, the assembly comprising a resiliently urged over-center mechanism configured for step-wise rotation of both of peripheral elongate portions between said plural stable positions.

* * * * *